(12) United States Patent
Chen

(10) Patent No.: US 6,281,889 B1
(45) Date of Patent: Aug. 28, 2001

(54) MOIRE CANCELLATION CIRCUIT

(75) Inventor: Jerry Chen, Taipei (TW)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/032,990

(22) Filed: Mar. 2, 1998

(51) Int. Cl.[7] .................................................. G09G 5/00
(52) U.S. Cl. ........................ 345/204; 348/806; 358/242; 315/370; 345/213
(58) Field of Search ................................. 345/112, 211, 345/213, 204; 348/806; 358/242; 315/370

(56) References Cited

U.S. PATENT DOCUMENTS

| | | | |
|---|---|---|---|
| 4,599,655 | * 7/1986 | Hinn ....................................... | 358/242 |
| 5,107,188 | * 4/1992 | Rindal ..................................... | 315/370 |
| 5,440,353 | * 8/1995 | Yamazaki et al. .................... | 348/806 |

* cited by examiner

*Primary Examiner*—Richard A. Hjerpe
*Assistant Examiner*—Kevin M. Nguyen
(74) *Attorney, Agent, or Firm*—Lanny L. Parker

(57) ABSTRACT

A circuit (300) for reducing Moiré effects in a display by delaying in alternate horizontal display lines a received horizontal drive pulse (HDRV IN), the circuit having: a current source arrangement (304, 314.1–314.n, 316.1–316.n) for tracking the display scanning speed and for producing a current which is representative of a binary input value (DVAL); a capacitor (308) arranged to be charged by the current; and a comparator (310) connected to the capacitor for delaying the received horizontal drive pulse by an amount dependent on the rate of charging of the capacitor. The circuit provides auto tracking with display scanning speed and programmability of the delay value. The circuit can be fabricated in integrated circuit form.

5 Claims, 1 Drawing Sheet

MOIRE CANCELLATION CIRCUIT

FIELD OF THE INVENTION

This invention relates to a circuit for reduction, typically referred to as cancellation, of Moiré effects.

BACKGROUND OF THE INVENTION

Moiré effects occur in displays due to interference between images and are particularly noticeable in pixelated image displays such as conventional cathode ray tube (CRT) displays. Moiré cancellation is a key feature of high-end display monitors (e.g., for computer CRT displays having a diagonal screen size of 17" and above).

For such high-end monitors, auto speed tracking and programmable delay time for Moiré cancellation is becoming a demand because of the increasing number of video resolution modes which causes CRT speed to vary in a wide range.

Moiré cancellation is typically implemented in an analogue circuit in the time base integrated circuit (IC) of a display system, and it is known for such analogue Moiré cancellation circuitry to incorporate auto speed tracking and programmable delay time.

Moiré cancellation can alternatively be implemented in a simple digital circuit outside the time base IC if the IC does not provide such a feature, but the analogue techniques for auto speed tracking and programmable delay time would be very difficult to implement in such digital circuitry since the technologies of the analogue and digital circuits are so dissimilar. In conventional digital approaches, Moiré cancellation is typically implemented with a fixed delay time.

It is an object of the present invention to provide a Moiré cancellation circuit which uses a digital approach, which can be incorporated in a digital Time Base integrated circuit, and which can provide auto speed tracking and programmable delay time.

It is an object of this invention to provide a Moiré cancellation circuit which uses a digital approach, which can be incorporated in a digital Time Base integrated circuit, and in which the above disadvantages may be overcome or at least alleviated.

BRIEF SUMMARY OF THE INVENTION

In accordance with the present invention there is provided a Moiré cancellation circuit as claimed in claim 1.

BRIEF DESCRIPTION OF THE DRAWINGS

One embodiment of the invention will now be more fully described, by way of example only, with reference to the accompanying drawings, in which.

DETAILED DESCRIPTION OF THE DRAWINGS

Figure 1:
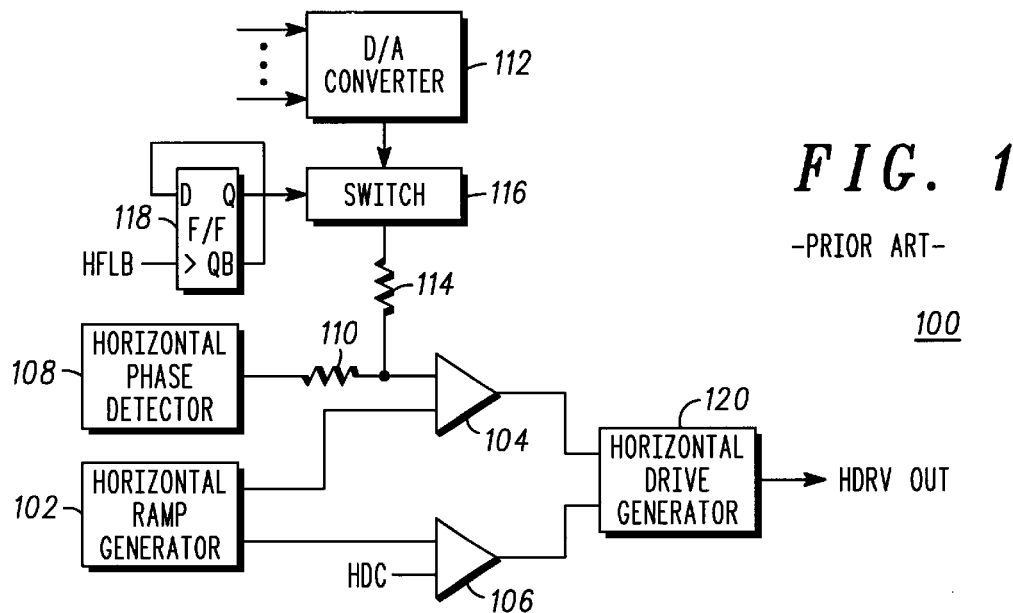
FIG. 1 shows a block schematic diagram of a first Moiré cancellation circuit utilising a conventional analogue approach.

Referring firstly to FIG. 1, a first, known Moiré cancellation circuit 100, which is typically fabricated in a Time Base integrated circuit for a CRT display, utilises a conventional analogue approach. In the known Moiré cancellation circuit 100, a horizontal ramp generator 102 applies output signals to comparators 104 and 106. Comparator 106 also receives as another input a signal HDC representative of the horizontal duty cycle of the display. A horizontal phase detector 108 produces an output signal which is applied via resistor 110 to another input of the comparator 104. A desired delay value is applied to a linear digital-to-analogue converter 112, which produces a representative analogue signal which is applied (via a resistor 114 and a switch 116 controlled by a D-type flip-flop 118 which receives a horizontal flyback signal HFLB) to the input of comparator 104 which receives the horizontal phase detector output. The outputs of the comparators 104 and 106 are applied to a horizontal drive generator 120 which produces the circuit's output signal HDRV OUT.

It will be understood that in use of the known circuit 100, Moiré cancellation is achieved by adding (under the control of the switch 116 and the flip-flop 118) an offset to the input of the comparator 104 in alternate scan lines, which creates a phase shift in the HDRV OUT output signal in alternate scan lines. It will be appreciated that the circuit's delay time is variable by varying the value applied to the digital-to-analogue converter 112, and that the circuit is auto speed tracking by virtue of the horizontal duty cycle input to the comparator 106. However, it will also be appreciated that since the circuit relies on analogue technology, it is subject to the issues of performance variably and component matching for which analogue circuits are well known.

Figure 2:
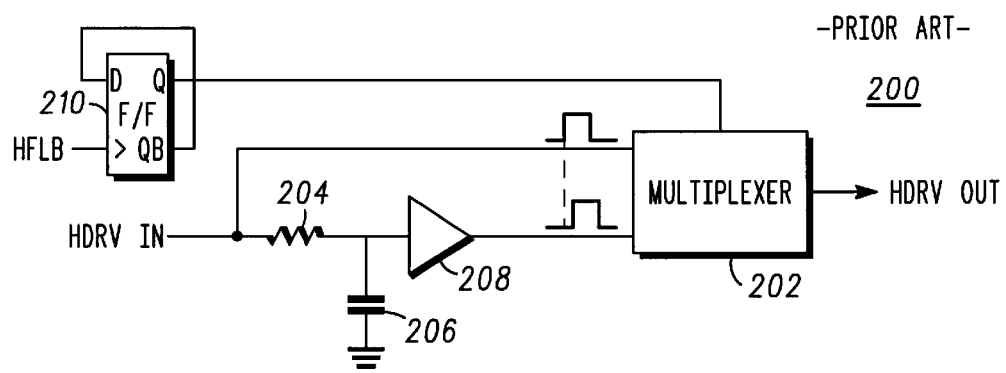
FIG. 2 shows a block schematic diagram of a second Moiré cancellation circuit utilising a conventional digital approach.

Referring firstly to FIG. 2, a second, known Moiré cancellation circuit 200, which is typically fabricated as an external circuit to be positioned after the output of a Time Base integrated circuit for a CRT display, utilises a conventional digital approach. In the known Moiré cancellation circuit 200, the circuit's input signal HDRV IN (e.g., taken from the horizontal drive output signal from an analogue Time Base integrated circuit (not shown)) is applied directly to an upper input of a multiplexer 202. The signal HDRV IN is also applied (via resistor 204, capacitor 206 and amplifier 208) to a lower input of the multiplexer 202. Switching of the multiplexer 202 between its upper and lower inputs is controlled by a D-type flip-flop 210 which receives a horizontal flyback signal HFLB.

It will be understood that in use of the known circuit 200, the resistor 204, capacitor 206 and amplifier 208 act as delay network to delay (i.e., phase shift) the signal applied to the lower input of the multiplexer 202. Moiré cancellation is achieved by (under the control of the flip-flop 210) alternately using the phase-shifted and unshifted HDRV IN signals as the circuit's output signal HDRV OUT, thus creating a phase shift in the HDRV OUT output signal in alternate scan lines. It will be appreciated that since the circuit's delay time is generated by RC components, it is difficult to make this delay time programmable. It will also be appreciated that it is not possible easily to make the circuit auto speed tracking.

Figure 3:
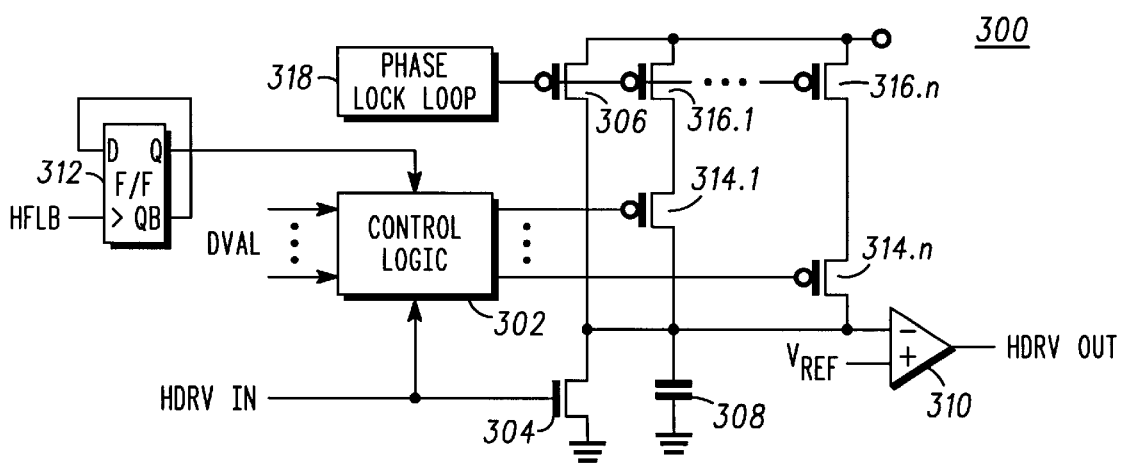
FIG. 3 shows a block schematic diagram of a novel Moiré cancellation circuit utilising a digital approach.

Referring now to FIG. 3, a novel Moiré cancellation circuit 300, which can be fabricated in a Time Base integrated circuit for a CRT display, utilises a digital approach, yet provides programmable delay time and auto speed tracking. In the Moiré cancellation circuit 300, the circuit's input signal HDRV IN is applied to control logic 302 (whose function will be described in greater detail below), and to the gate electrode of a FET transistor switch 304. The FET transistor switch 304 has its source and drain electrodes connected between ground and a current source 306. The FET transistor switch 304 has its drain electrode connected, via a grounded capacitor 308 to one input of a comparator 310. Another input of the comparator 310 is connected to receive a reference voltage VREF.

A D-type flip-flop 312, which is connected to receive a horizontal flyback signal HFLB, has an output connected to an input of the control logic 302. The control logic 302 is also connected to receive as an input a binary value DVAL of length of n bits. As will be explained in greater detail below, the control logic 302 produces n outputs corresponding to the n bits of the input digital value DVAL.

The n outputs of the control logic 302 are connected respectively to the gate electrodes of n FET transistor switches 314.1–314.n (of which only two, are shown), which are connected between the drain electrode of FET 304 and respective ones of n current sources 316.1–316.n (of which only two are shown). The n current sources 316.1–316.n are arranged to produce currents ranging from progressively from ½ to ½n of the current produced by the current source 306. Thus, the current source 316.1 produces a current which is ½ that of current source 306, the current source 316.2 produces a current which is $\frac{1}{2}^2$ that of current source 306, etc., with the current source 316.n producing a current which is $\frac{1}{2}^n$ that of current source 306. All of the current sources 306 and 316.1–316.n are controlled by a current mirror reference signal from a voltage controlled oscillator (VCO) phase lock loop (PLL) 318 which is utilised elsewhere in the Time Base integrated circuit, and which is locked to the horizontal display frequency.

In use of the novel circuit Moiré cancellation circuit 300, an input HDRV IN signal is applied to the control logic 302 and to the gate electrode of the FET 304. On horizontal scan lines when no output is produced by the flip-flop 312, the input HDRV IN signal goes high and causes the capacitor 308 and the inverting input of the comparator 310 is pulled low, causing the comparator output signal HDRV OUT to go high. When the input signal HDRV IN goes low, the FET 304 turns off, causing the capacitor 308 to be charged by from the current source 306. When the voltage on the capacitor 308 exceeds the reference voltage VREF, the capacitor 310 changes its output state and drives the output signal HDRV OUT low.

However, in alternate horizontal scan lines the flip-flop 312 produces an output signal and causes the control logic 302 to drive high those of its output lines for which a corresponding bit of an input binary value DVAL is "1". The effect of this is that when the input HDRV IN signal goes high the capacitor 308 and the inverting input of the comparator 310 is pulled low, causing the comparator output signal HDRV OUT to go high, as before. Now however, when the input signal HDRV IN goes low and the FET 304 turns off, the capacitor 308 is charged not just from the current source 306 but also from those of the current sources 316.1–316.n whose corresponding bits in the binary value DVAL are "1". Thus, the capacitor 308 is now charged at a higher current (assuming the binary value DVAL is non-zero) than before, causing the capacitor to be charged at a faster rate. When the voltage on the capacitor 308 exceeds the reference voltage VREF, the capacitor 310 changes its output state and drives the output signal HDRV OUT low.

It will be understood that the effect of this is that in alternate horizontal scan lines the falling edge of the output signal DRVR OUT (which is the triggering edge used by subsequent circuitry) occurs at an earlier time, the amount of time difference being determined by the value DVAL. It will be appreciated that the result of this to produce a phase difference in the triggering edge of the drive signal in alternate display lines, which reduces (or cancels) Moiré effects in the resultant display.

It will further be appreciated that the circuit 300 allows the delay time of Moiré cancellation to be varied or programmed) by varying the value DVAL which is used input to the control logic. It will be further appreciated that the circuit 300 is inherently auto speed tracking since the current mirror reference signal from the voltage controlled oscillator (VCO) phase lock loop (PLL) 318 (which is used to enable the current sources 306 and 136.1–316.n) is locked to the horizontal display frequency so automatically tracks to match the CRT scanning speed.

It will also be appreciated that the circuit 300 can be easily fabricated in an integrated circuit, while still retaining its features of programmability and auto speed tracking.

It will be appreciated that modifications of the circuit 300, such as varying the ratios of the current sources 316.1–316.n, may be made without departing from the scope of the present invention.

What is claimed is:

1. A circuit for reducing Moiré effects in a display, the circuit comprising:
    pulse receiving means for receiving an input horizontal drive pulse; and
    delay means for delaying the received horizontal drive pulse in alternate horizontal display lines, the delay means comprising:
        a digitally programmable current source means arranged to track the display scanning speed and for producing a programmed output current which is representative of an input binary value, the digitally programmable current source comprising:
            an input for receiving a current that tracks the display scanning speed;
            three or more digital inputs for receiving the input binary value; and
            an output for producing the programmed output current;
        capacitor means arranged to be charged by said programmed output current; and
        output means responsive to the rate of charging of said capacitor means for producing an output horizontal drive pulse which is delayed relative to the input horizontal drive pulse by a time dependent on the rate of charging of said capacitor means by the programmed output current.

2. The circuit as claimed in claim 1 wherein the digitally programmable current source means comprises three or more current sources arranged to cumulatively provide the programmed output current to charge the capacitor means under the respective control of the states of bits comprising a binary representation of said input binary value.

3. The circuit as claimed in claim 2 wherein the three or more current sources are arranged to be enabled by the current received at the input of the digitally programmable current source, and wherein the current comprises a signal from a horizontal timing reference signal of the display.

4. The circuit as claimed in claim 3 wherein the horizontal timing reference signal is a current mirror reference signal from a voltage controlled oscillator phase lock loop.

5. The circuit as claimed in claim 1 wherein the output means comprises comparator means for comparing the capacitor means voltage with a reference voltage and for producing the output horizontal drive pulse in response thereto.

* * * * *